(12) United States Patent
Alvarez

(10) Patent No.: US 7,121,526 B2
(45) Date of Patent: Oct. 17, 2006

(54) DRAIN PLUG ASSEMBLY

(76) Inventor: Alfredo Alvarez, 1116 Sandwick Way, Folsom, CA (US) 95630

( * ) Notice: Subject to any disclaimer, the term of this patent is extended or adjusted under 35 U.S.C. 154(b) by 616 days.

(21) Appl. No.: 10/678,695

(22) Filed: Oct. 2, 2003

(65) Prior Publication Data

US 2005/0072951 A1 Apr. 7, 2005

(51) Int. Cl.
*F16K 31/44* (2006.01)
(52) U.S. Cl. .................. 251/215; 114/197; 220/235; 215/356; 411/325; 251/144
(58) Field of Classification Search .............. 251/144, 251/215, 273; 114/197, 198; 222/554, 563; 138/89; 220/233, 235; 411/325, 324, 395, 411/568, 570, 913
See application file for complete search history.

(56) References Cited

U.S. PATENT DOCUMENTS

| | | | |
|---|---|---|---|
| 258,775 A | 5/1882 | Leavitt, Jr. | |
| 1,411,031 A | 3/1922 | Jackson | |
| 2,474,430 A | 6/1949 | Laue | |
| 2,800,912 A | 7/1957 | McCamish et al. | |
| 3,351,966 A | * 11/1967 | Pelochino | .................. 470/14 |
| 3,643,917 A | * 2/1972 | Griffiths et al. | .............. 251/215 |
| 3,948,481 A | * 4/1976 | Pollock | ...................... 251/351 |
| 4,198,918 A | 4/1980 | Patriarca et al. | |
| 5,333,837 A | 8/1994 | Reese | |
| 5,368,181 A | 11/1994 | Myers | |
| 6,062,540 A | 5/2000 | Hubler | |
| 6,237,639 B1 | 5/2001 | Jougla et al. | |

* cited by examiner

*Primary Examiner*—Edward K. Look
*Assistant Examiner*—John K. Fristoe, Jr.
(74) *Attorney, Agent, or Firm*—John P. O'Banion

(57) ABSTRACT

A drain plug for a threaded opening in a fluid container that is particularly suited for transom drains in recreational boats. The plug has an externally threaded cylindrical body with a central channel and transverse openings to permit fluid to flow from the central channel out of the body of the plug. One end of the plug is flared and has a plurality of longitudinal slots that will allow the radial compression of the end when the plug is screwed into a threaded opening. In one embodiment, the radial compression of the end of the flared plug is limited by a ring that fits in an annular groove in the interior of the body in the central channel. In another embodiment, the external threads are tapered near the handle to provide a tight seal when the drain is fully closed. Another embodiment provides an o-ring to seal the drain plug when the drain is closed.

34 Claims, 4 Drawing Sheets

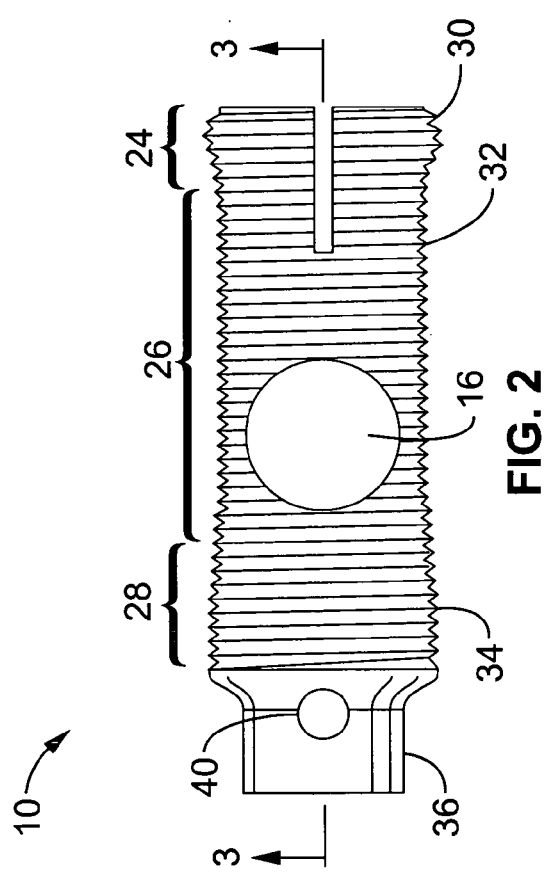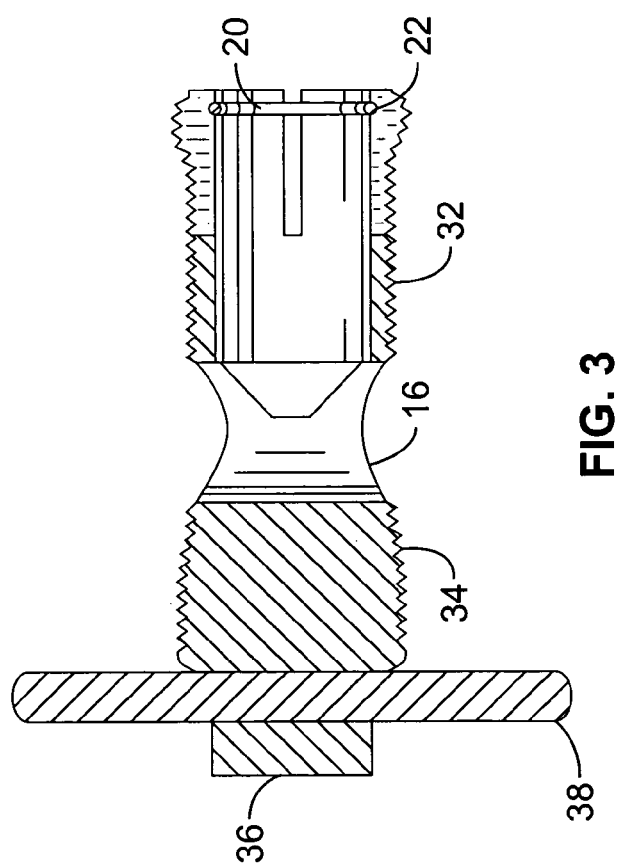

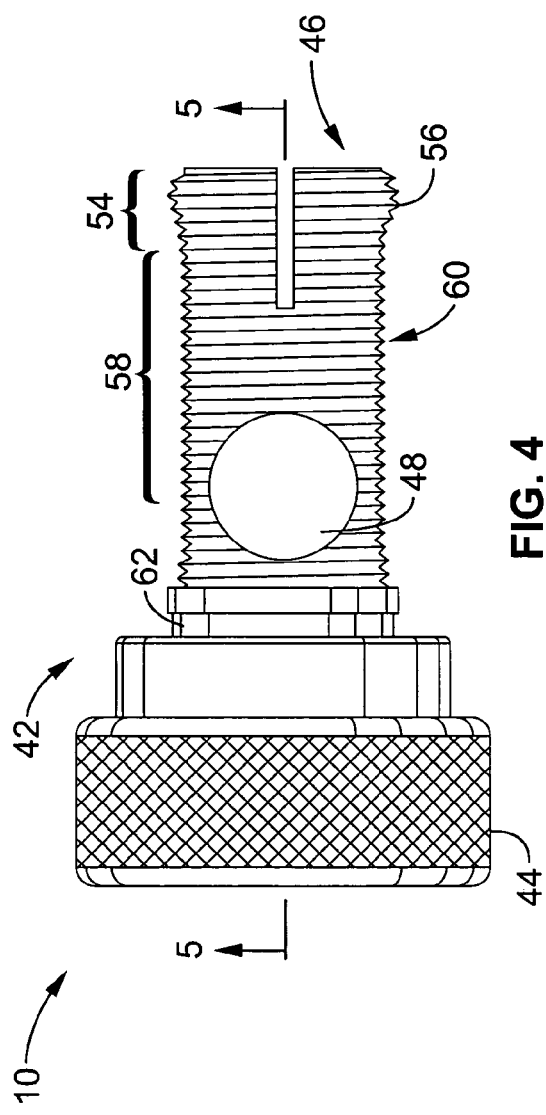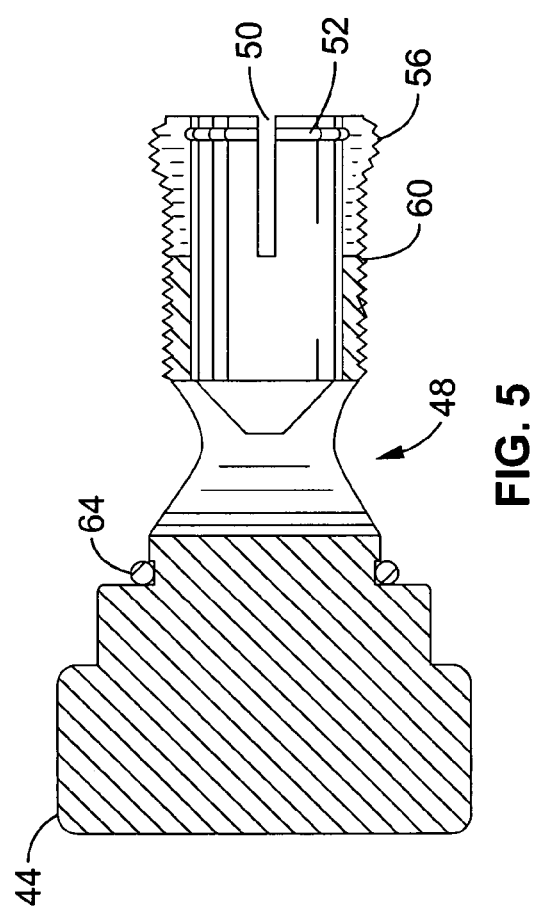

DRAIN PLUG ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to fluid relief valves, and more particularly to a drain plug assembly that has a threaded drain port that is configured to mate with a plug that has a flared and slotted end that prohibits the accidental removal of the plug from the port during use.

2. Description of Related Art

Numerous valves and plugs adapted to control the flow of fluid to and from the interior of containers and vessels have been devised. Such valved or plugged openings are often designed to allow collected fluid to drain from the container. For example, many types of marine vessels use a bore through the transom to permit the flow of accumulated bilge water out of the interior or engine well of the vessel when the vessel is removed from the water. The bore is normally positioned at a low point on the transom of the hull to facilitate the drainage of fluid out of the hull by forces of gravity. In the case of recreational boats, the boat typically is removed from the water on a trailer and then the plug is removed from the trans-hull bore when the boat is at an incline on the boat launch ramp. Water is thereby allowed to drain from the hull prior to transportation or storage of the boat.

Removal of water from the hull of a marine vessel is important in order to avoid damage to the mechanical and electrical components of the vessel as well as the hull during transportation or storage. For example, water left in the hull of the vessel can result in structural damage if allowed to freeze during storage and may also be the source of rot, corrosion, mold, mildew and unwanted odors. In addition, water may accumulate in the hull from rain or melting snow during storage. The level of existing water in the hull may be increased from these additional water sources and infiltrate the fuel, mechanical and electrical systems of the vessel causing damage to these systems. High interior water levels may also cause damage to the contents of vessel. Consequently, recreational boats are routinely transported and stored with the plug removed from the transom drainage bore of the vessel.

Many types of transom drain plugs are known in the art. Some plugs are made of rubber and may include a means for compressing the plug to increase the frictional force exerted by the plug in the transom drainage bore and reduce the chance of unintentional removal of the plug during use of the vessel. Other common plugs include threaded metal plugs that are advanced upon corresponding threads in a flange or collar disposed in the transom bore.

Conventional drainage plugs must be manually inserted into the transom bore prior to launching the vessel into the water. If the vessel is launched without the proper placement of the plug, water can enter the engine compartment and hull of the vessel through the drainage bore which creates a risk of sinking or internal damage to the vessel if the failure to place the plug is not discovered. Replacement of the plug while the vessel is in the water can often be difficult because of the placement of the bore far below the waterline and the difficulties encountered while attempting to thread the plug in the bore under water.

Operation of the vessel that has a drainage bore is not possible without the proper placement of the plug. As an independent component, the plug can be misplaced or lost after removal. Storage of the plug in a secure place may not provide easy access to the plug if the vessel is launched without the plug in place.

Accordingly, in order to avoid the risk of sinking or damage to a vessel after launch, there is a need to have a drain that can be conveniently opened and closed without the need to independently store the plug during transportation and storage of the vessel. The present invention satisfies this need, as well as others, and generally overcomes the limitations of the prior art.

BRIEF SUMMARY OF THE INVENTION

The present invention is a container plug that allows the user to regulate the flow of contents to or from a container when open and to seal the contents of the container when the drain is closed. One drawback of prior boat plugs, for example, is that the user often forgets to insert the transom plug or looses the plug during drainage or transportation of the boat. The apparatus of the present invention provides a plug that will not be inadvertently removed from the drainage bore or lost during drainage or transportation of the boat or container. One embodiment of the present invention will also allow the quick and easy insertion of the plug under the waterline or closure of the drain if the boat owner forgets to plug the transom drain after launching the boat.

By way of example, and not of limitation, one embodiment of the invention includes a cylindrical plug body with a central channel and transverse bores. The body also includes a handle on one end and a plurality of slots on the other that permits the circumferential compression of the end of the plug during insertion into the threaded opening of the drain port of the container.

To install the plug in a threaded bore or drain port of a container, the tip of the threaded body engages the port and the flared tip of the plug body compresses radially and circumferentially as the plug is advanced on the threads of the drain port. The compression allows the flared end of the plug to pass through the threaded center of the body of the port, which has a length that is preferably shorter than the length of the plug body. Once the flared end of the plug passes through the port, the end of the plug decompresses to the original dimensions that are slightly greater than the dimensions of the body of the port. The plug may continue to be screwed into the threaded port until the plug is secure and fully closed. In one embodiment, the handle has an O-ring that seals the plug with the drain port. In another embodiment, the radial dimensions of the body gradually increase near the handle so that the threads of the plug body tightly fit with the mated threads of the drain port and seal the drain.

Fluid may be drained by unscrewing the plug to expose the transverse bores in the sidewalls of the plug body. The drain plug can be easily rotated until the threads of the flared end of the body engage the threads of the drain opening. Rotation of the body will become substantially difficult to indicate to the user to stop unscrewing the drain plug. It can be seen that the drain plug need not be removed from the port after installation since the fluid drains through the central channel and out of the transverse bores that are preferably exposed without removing the plug from the threaded opening. The threads of the flared end of the plug body keep the plug firmly in the drain opening when the plug is in the open position and therefore the plug will not be inadvertently removed when the drain is initially opened or during the draining of the container. In addition, the drain plug can be opened or closed without the need to orient, insert and rotate the drain plug within a flow of fluid exiting the container since the plug is always oriented within the drain opening of the container.

In addition, even though it is unnecessary to completely remove the drain plug to open the drain, it will be seen that the plug can be completely removed from the container by forceful rotation of the plug compressing the flared end of the plug body. The plug can then be transferred to another container if desired or replaced in the drain port of the container at a later time.

According to one aspect of the invention, a drain plug is provided that has a tubular body with an expandable end that is configured to radially compress when the plug is initially inserted into a threaded drain port of a container.

According to another aspect of the invention, a tubular body is provided with a closed end with a handle and a flared open end having a plurality of longitudinal slots and a plurality of transverse bores and the flared end of the tubular body is configured to radially compress when the body inserted in a tubular port of a container.

A further aspect of the invention provides a drain plug apparatus for a marine vessel having a threaded tubular port that has a cylindrical body with a central channel and a plurality of transverse bores fluidly connected to the central channel. The cylindrical body also has a plurality of external threads and a flared closed end as well as a flared open end that is configured to radially compress when inserted in a threaded tubular port. The external threads of the flared closed end and the flared open end of the cylindrical body are sized to be greater than or equal to the diameter of the threaded tubular port.

A still further aspect of the invention is to provide a cylindrical tubular body with tapered threads at the handle end, straight threads in the middle and raised threads at the flared tip of the tubular body.

Yet another aspect of the invention is to provide a means for restricting the radial compression of the flared open end of the tubular body.

Another aspect of the invention is to provide a drain plug that can be retrofitted into existing containers that have threaded openings.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only:

FIG. 2 is a side view of the drain plug embodiment shown in FIG. 1.

FIG. 3 is a side cross sectional view of the drain plug shown in FIG. 2 taken along the lines 3—3 of FIG. 2.

FIG. 4 is a side view of an alternative embodiment of the drain plug according to the present invention.

FIG. 5 is a cross-sectional view of the drain plug of FIG. 4 taken along the lines 5—5 according to the present invention.

DETAILED DESCRIPTION OF THE INVENTION

Referring more specifically to the drawings, for illustrative purposes the present invention is embodied in the apparatus generally shown in FIG. 1 through FIG. 7. It will be appreciated that the apparatus may vary as to configuration and as to details of the parts without departing from the basic concepts as disclosed herein. The present invention pertains to a container plug that can be used to drain and seal the container and will not be inadvertently removed during use. The transom drain of a typical powerboat is used as an illustration of a type of container and is not meant to be limiting.

Figure 1:
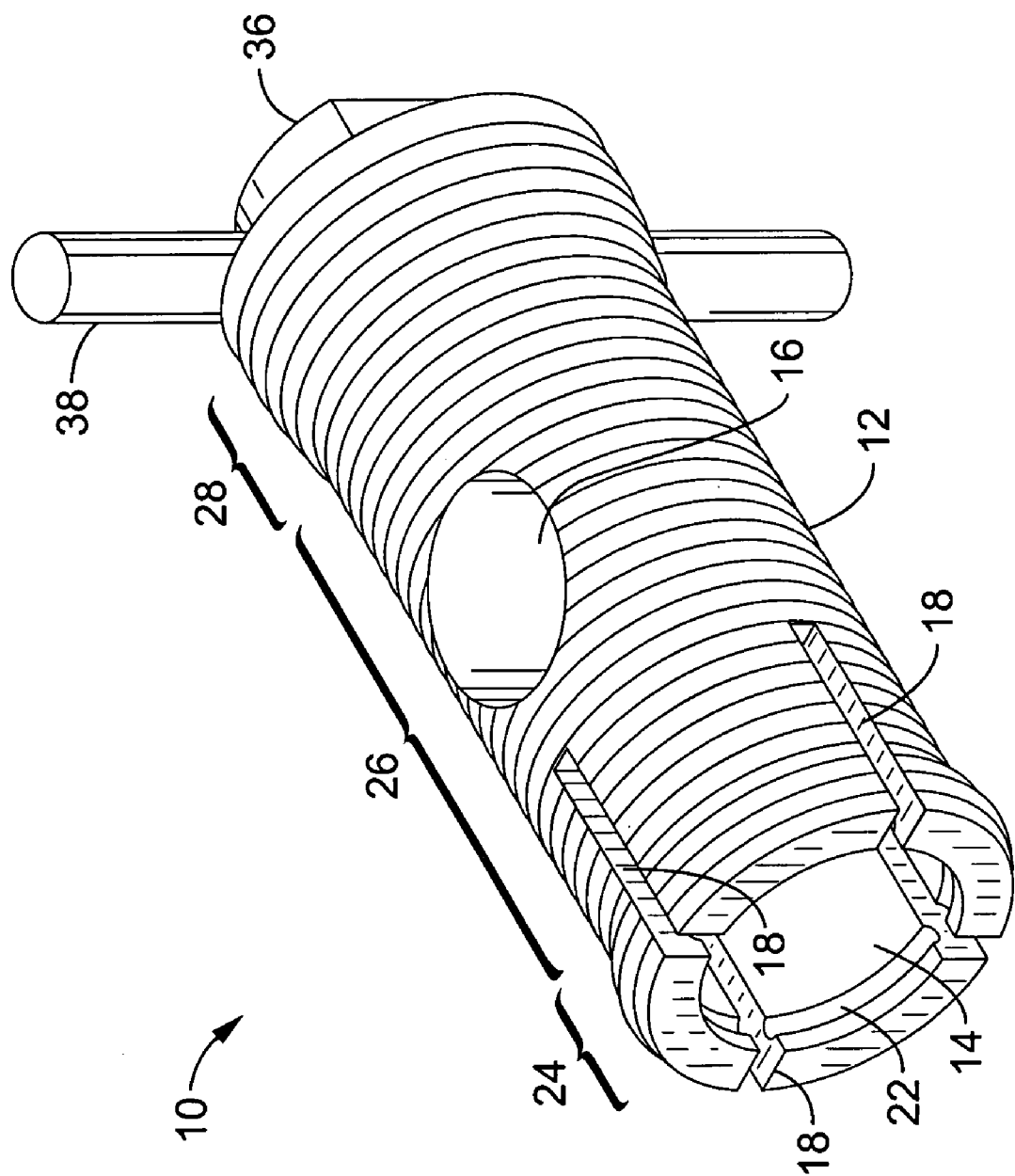
FIG. 1 is a perspective of one embodiment of a drain plug according to the present invention.
Figure 7:
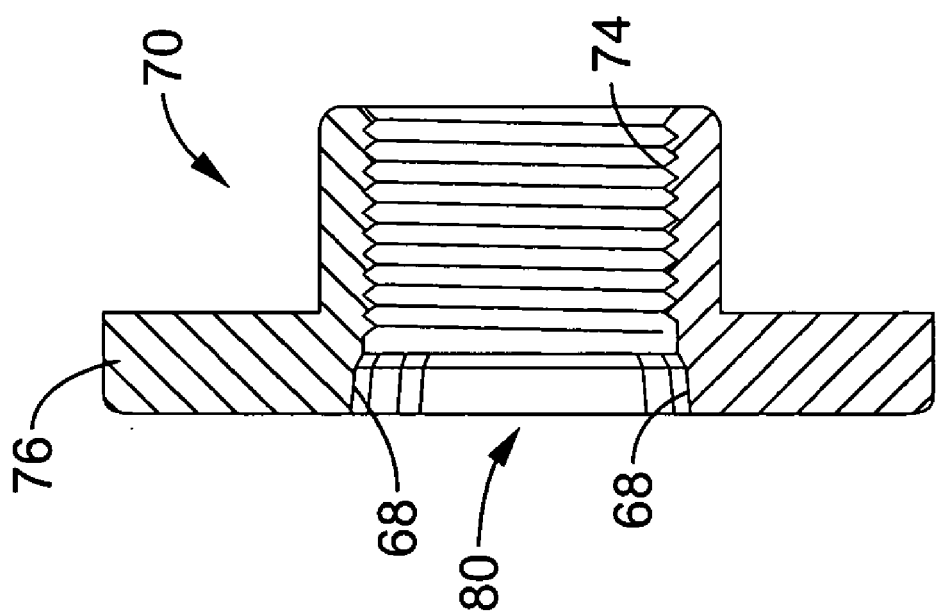
FIG. 7 is a cross-sectional view of the plug drain port shown in FIG. 6 taken along the lines 7—7 of FIG. 6.
Figure 6:
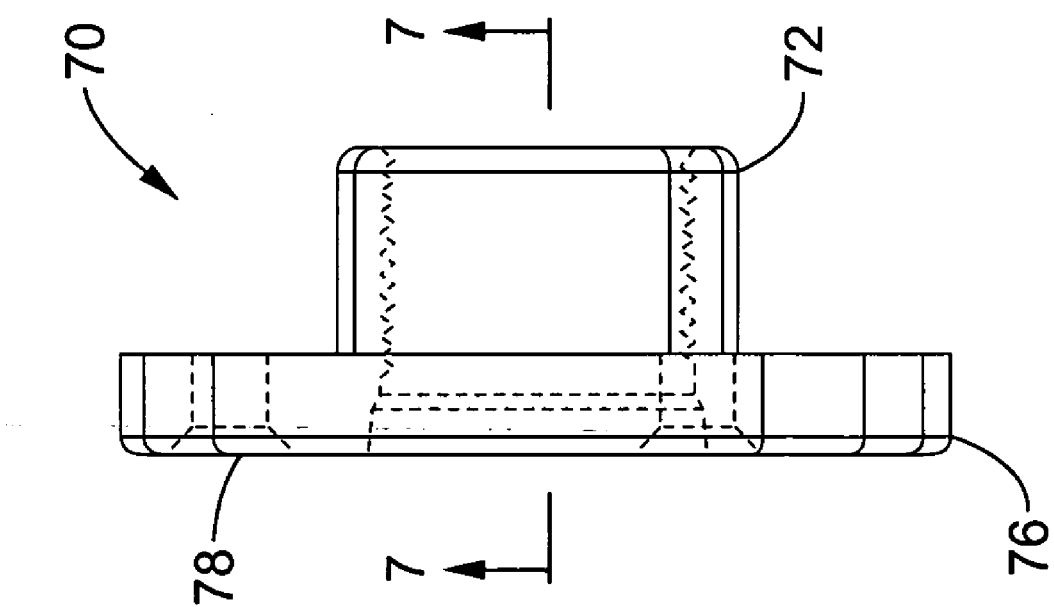
FIG. 6 is a side view of one embodiment of a plug drain port according to the present invention.

Referring first to FIG. 1, FIG. 2 and FIG. 3 one embodiment of the drain plug 10 according to the invention comprises a generally cylindrical body 12 with a longitudinal central channel 14 through the proximal end of the body 12. The distal end of the body 12 is closed. There is a pair of radial bores 16 through the sidewall of the cylindrical body 12, which open the central channel 14 to the exterior of the body 12. Although a pair of transverse bores is used in the embodiment shown, it will be understood that any number of bores can be used and positioned in the sidewalls of cylindrical body 12. In one embodiment a single bore 16 is used to permit the directional flow of fluid from the cylindrical body 12.

Not only can the number of bores 16 vary, the diameter of the bores 16 can be varied as well to regulate the rate of flow of fluid through the body 12 of drain plug 10. Different sized bores 16 may also be placed at different positions along the length of the body 12 in another embodiment to regulate and change the rate of drainage from the container depending on the position of the plug in the threaded opening.

The body 12 also has a plurality of notches or slots 18 in the proximal end that begin at the opening of the central channel 14 and extending longitudinally along a portion of the length of body 12. It can be seen that the slots 18 will allow the proximal end of the body 12 to radially compress slightly during installation and use. Although two pairs of slots are preferred, it will be understood that one or more slots can be used to allow varying amounts of radial compression. The radial compression of the flared open end of the plug body 12 may optionally be further limited by a retaining ring 20 that fits in an annular groove 22 located on the interior surface of channel 14 of the plug body 12. Retaining ring 20 is preferably resilient and therefore resists the radial compression of the proximal end of the plug body 12 during use or installation. The retaining ring 20 will also preferably completely limit the inward radial movement of the sections defined by slots 18 of the proximal end of the body 12 to avoid over compression of the sections and the potential for breaking the sections.

As particularly seen in FIG. 2 and FIG. 3, the exterior surface of plug body 12 is threaded. In the embodiment shown, the exterior threads are in three sections. The first or tip section 24 of body 12 located at the proximal end has a slightly greater diameter than the middle section 26 of the body 12. As a consequence, the first set of threads 30 in this section has taller threads than the adjacent set of threads 32 of section 26. The taller threads 30 facilitate the radial and circumferential compression of the sections of the proximal open end of body 12 when the threads are advanced in an existing threaded port or drain seat.

In one embodiment, the threads 30 of the tip section 24 have an upward taper beginning from the end of body 12 reaching a peak and then a downward taper to the straight threads of section 26. The threads 30 preferably have the same pitch as the adjacent threads 32 to provide an easy transition between threads. A change in height of approximately 0.025 inches to approximately 0.050 inches from the base to the peak is preferred in this embodiment. Any type of tapered threads may be used for threads 30 but ¾-NPT threads are preferred. In this embodiment, the tapered threads 30 used in the tip section 24 provide a tight seal when the plug is opened but not removed. The distal portion of threads 30 that are tapered downwards from the peak engage the interior threads of back section of the drain port providing a seal.

In another embodiment, the tip section 24 has common thread sizes but the proximal end of the body is flared or biased outwardly. In this embodiment, (not shown) the tip is also compressed during the advancement of the threads 24 within the drain port or seat.

The threads 32 of the middle section 26 of plug body 12 are preferably straight threads to allow easy rotation of the plug within the threaded opening of the drain of a container during use. It will be seen that once the threads 30 of the tip section 24 are advanced through a threaded drain port, the tip section 24 will expand radially back to the original position and the torque necessary for axial rotation of the body 12 will be reduced.

The third threaded section 28 of the exterior of body 12 has threads 34 that are adjacent and contiguous with the threads 32 of the middle section 26 of the body 12. In the embodiment shown in FIG. 1 through FIG. 3, the section 28 has a slowly increasing diameter so that threads 34 have a gradual taper that increases toward the distal end of the body 12. The threads will provide an increasingly tighter fit within a threaded opening as the threads are advanced thereby providing a fluid-tight seal. There are many types of tapered threads known in the art that can be used depending on the contents of the container and whether the contents are under pressure including NPT, NPTF, NPSM, BSPT, BSPP threads and the like. However, ¾-NPT threads are preferred for use with section 28 of the transom plug embodiment shown in FIG. 1 through FIG. 3.

The distal end of plug body 12 is closed and has a handle 36 to permit the orientation and axial rotation of the plug body 12 in a drain coupling or seat. In the embodiment shown in FIG. 1 through FIG. 3, the handle 36 includes a roll pin 38 disposed in a corresponding transverse hole 40 to provide a mechanical advantage to the user during rotation of the drain plug body 12. While a roll pin is shown in FIG. 1 through FIG. 3, the handle 36 may be a knurled knob or the like as shown in FIG. 4 and FIG. 5. Handle 36 may also have a shaped end that is configured to engage a standard wrench or may include a socket or other tooling system that will assist with the rotation of the plug body 12 during use.

In use, the drain plug 10 of the present invention may be sized to couple with an existing threaded drain flange or drain port such as those commonly used with a transom of a conventional boat. The threads 30 of the tip section 24 of body 12 engage and are advanced through the threads of the opening of the drain of the boat. The proximal end of body 12 radially compresses while the body 12 advances on the threads of the drain flange facilitated by slots 18 and the taller threads 30. The compression of the sections of the proximal end of the body 12 is limited by retaining ring 20 in the embodiment shown.

Once the threads 30 of the tip 24 of the body 12 have advanced through the threads of the drain port, the proximal end of the body 12 expands and returns to the original resting position and the threads of the port only engage the threads 32 of middle section 26. If the plug body 12 continues to be advanced, the threads 34 of tapered section 28 will engage the threads of the port and provide a water-tight seal. The plug is now in the fully closed position and water is incapable of entering or being eliminated through the transom.

In the illustration shown, the drain plug 10 may be used when the boat is withdrawn from the water and removal of bilge water is desired. The drain plug is rotated axially until the threads 30 of the tip section 24 engage the threads of the opening of the drain port. This gives a tactile indication to stop rotation because it is more difficult to turn the body 12 to compress the tip. It can be seen that the drain plug body 12 in this open position allows bilge water to drain through the port and the central channel 14 to the transverse bores 16 of the drain plug and out of the vessel.

The drain plug 10 need not be completely removed from the drain port to drain the container and the plug body 12 is placed securely within the port during draining. Therefore, it can be seen that the plug will not be lost during draining or misplaced after installation because the plug is never removed from the opening and is firmly engaged with the threaded opening during use. Furthermore, the drain plug 10 can be closed before the draining is complete without the need of orienting the plug in the stream of fluid and mating the threads as is required with conventional plugs. This may eliminate the presence of unwanted fluid over the hand of the user and the area underneath the container when the user desires to stop the flow of fluid.

Turning now to FIG. 4 and FIG. 5, an alternative embodiment of the drain plug 10 is shown. A preferred drain port 70 with a seat 68 that is configured to couple with this plug embodiment is also generally shown in FIG. 6 and FIG. 7. However, it will be understood that this embodiment of the plug 10 may also be used with certain existing threaded drain openings that have perpendicular walls or surfaces that can engage an O-ring.

The alternative embodiment of plug 10 shown in FIG. 4 and FIG. 5 has a cylindrical body 42 with a handle 44 on the distal end with a knurled knob for easy gripping by the user. The cylindrical body 42 has a central channel 46 and a pair of transverse bores 48 connected to the central chamber 46. The cylindrical body 42 also has preferably four longitudinal slots 50 extending from the proximal end of the plug body 42 toward the middle section of the body 42. In the embodiment shown, there is an optional retaining ring (not shown) that is disposed in an annular groove 52 to restrict and limit the radial compression of the proximal end of the plug body 42.

The external surface of the plug body 42 has two sections of threads in the embodiment shown. The first section 54 has a set of threads 56 at the tip of the plug body 42. The section 54 has a larger diameter than the adjacent section 58 and therefore threads 56 are taller than the threads 60 of middle section 58. Threads 56 are contiguous with threads 60 even though the diameters of the sections are different.

In one embodiment, the threads 56 of the tip section 54 have an upward taper beginning from the end of body 42 reaching a peak and then a downward taper to the straight threads of section 58. The threads 56 preferably have the same pitch as the adjacent threads 60 to provide an easy transition between threads. There are many types of tapered threads that can be used including NPT, NPTF, NPSM, BSPT, BSPP and the like. However, ¾-NPT threads are preferred.

At the base of handle 44 there is an annular groove 62 that receives and retains an O-ring 64. Referring also the FIG. 6 and FIG. 7, it can be seen that O-ring 64 is sized to seat against a flat surface or preferably within a frustoconical surface 68 of the plug seat 70 when the plug body 42 is fully engaged with the seat 70. The plug seat 70 has a central threaded collar 72 with threads 74 on the interior surface of the collar 72 that are sized to engage the exterior threads of the plug body 42. The plug seat 70 also has a flange 76 at one end with the seat surface 68. Flange 76 has mounting holes 78 to assist in mounting the plug seat 70 to a drain hole in the transom or the like. The threaded collar is placed within the drainage hole until the flange 76 is flush with the horizontal wall of the transom, for example, and mounted with fasteners through mounting holes 78. It is preferred that the threaded collar section of the plug seat 70 be sized to exceed the thickness of the wall of the container.

In use, the threads 56 of tip section 54 of the proximal end of drain body 42 are placed in opening 80 of and engage threads 74 of the mounted plug seat 70. The tip section 54 is radially compressed as the plug body 42 is rotated axially due to the dimensions of threads 56 and the presence of slots 50 in plug body 42. After the tip section 54 clears the threads 74 of collar 72, the tip sections defined by slots 50 of body 42 decompress and expand back to the original dimensions. Continued rotation of the plug body 42 closes the drain plug. The threads 60 of section 58 of the plug body 42 engage the threads 74 of the plug port 70 until the O-ring 64 engages seat surface 68 of the plug port 70 thereby sealing the plug 10.

Upon removal of the boat from the water, the handle 44 of the plug is rotated to open the drain plug to drain bilge water, typically when the boat is resting on a trailer that is on the boat-launching ramp. When the bores 48 are outside of the port 70, bilge water can drain through central channel 46 and out of bores 48. It can be seen that the drain plug 42 will not inadvertently fall out of the port 70 when draining or transporting because of the engagement of the threads 56 and slots 50 of tip 54 of plug body 42 with the port 70. The flow of water from the bilge can also be easily stopped and started before the entire contents of the bilge are eliminated. The boat may also be transported with the drain in the open position because the flared section of the plug will keep the plug secure within the seat 70 during transportation. The plug 10 can also be conveniently stored in the transom opening.

Although a boat is used as an illustration, the drain plug of the present invention can be used in any setting where drainage of fluid from a container is desired. The rate of discharge of fluid from the container can be regulated by the position of the plug in the flange or seat that determines the portion of the transverse bore that is open to permit fluid flow from the central channel.

The plug of the present invention may be a retrofit of existing plugs and existing drain ports or may be used in combination with a drain plug port such as the embodiment described herein. The plug does not require special tooling or knowledge to install and use nor require modifications to the container. Once installed, the plug will not disassociate with the container preventing loss of the plug and the user has ready access to the plug handle.

The plug of the invention is preferably made from materials such as brass that do not readily corrode or oxidize or react with the fluids and may additionally have coatings to avoid corrosive interactions with liquids or gases. For example, plugs made from stainless steel do not need to include the annular groove and spring ring to restrict radial compression. Special materials may also be selected based on the expected temperature range to be experienced by the fluids or the container.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A drain plug apparatus for a container with a tubular port, comprising:
    a threaded tubular body with a closed end and a flared open end having a plurality of longitudinal slots and a plurality of transverse bores; and
    a handle;
    wherein said flared end of said tubular body is configured to radially compress when inserted into a tubular port of a container.

2. An apparatus as recited in claim 1, wherein said threaded tubular body further comprises:
    a first set of external threads; and
    a second set of external threads;
    wherein said first set of external threads and said second set of external threads are configured to engage threads in a threaded tubular port of a container.

3. An apparatus as recited in claim 2, wherein said first set of external threads of said threaded tubular body has a height that is greater than a height of said second set of external threads.

4. An apparatus as recited in claim 2, wherein said first set of external threads of said threaded tubular body have tapered threads and said second set of external threads are straight threads.

5. An apparatus as recited in claim 4, wherein said tapered threads of said first set of external threads of said threaded tubular body have a upward taper and a downward taper.

6. An apparatus as recited in claim 4, wherein said third set of external threads comprises tapered threads.

7. An apparatus as recited in claim 2, said threaded tubular body further comprising:
a third set of external threads contiguous with said second set of threads.

8. An apparatus as recited in claim 1, wherein said handle comprises a knurled knob.

9. An apparatus as recited in claim 1, wherein said handle comprises a polygonal shaped head.

10. An apparatus as recited in claim 1, wherein said handle comprises a metal rod.

11. An apparatus as recited in claim 1, wherein said tubular body further comprises:
an annular groove on an interior surface of said flared end of said tubular body; and
a resilient ring disposed within said annular groove.

12. An apparatus as recited in claim 1, further comprising means for sealing the plug with a tubular port of a container.

13. An apparatus as recited in claim 12, wherein said means for sealing comprises a seal disposed between said handle and a flange of said tubular port.

14. An apparatus as recited in claim 12, wherein said seal comprises an o-ring.

15. A drain plug apparatus, comprising:
a cylindrical body having a central conduit with at least one sidewall orifice, a flared end with plurality of longitudinal notches and external threads; and
a threaded drain port configured to be mounted within an opening in a container, said port having a threaded tubular collar sized to mate with the threads of said cylindrical body, and a flange;
wherein said flared end of said cylindrical body is configured to radially compress when inserted in said tubular collar of said threaded drain port.

16. An apparatus as recited in claim 15, further comprising a handle disposed on a closed end of said cylindrical body.

17. An apparatus as recited in claim 16, wherein said handle comprises a rod.

18. An apparatus as recited in claim 16, wherein said handle comprises a knurled knob.

19. An apparatus as recited in claim 15, further comprising means for sealing said cylindrical body with said threaded drain port.

20. An apparatus as recited in claim 19, wherein said means for sealing comprises a tapered set of threads on said closed end of said cylindrical body.

21. An apparatus as recited in claim 19, wherein said means for sealing comprises an o-ring.

22. An apparatus as recited in claim 19, wherein said means for sealing further comprises a beveled seat on said threaded drain port.

23. An apparatus as recited in claim 15, wherein said cylindrical body further comprises:
an annular groove on an interior surface of said flared end of said cylindrical body; and
a resilient ring disposed within said annular groove.

24. An apparatus as recited in claim 15, wherein said threads of said cylindrical body comprise:
a first set of external threads; and
a second set of external threads configured to engage corresponding threads in a threaded tubular port.

25. An apparatus as recited in claim 24, wherein said first set of external threads of said cylindrical body has a height that is greater than a height of said second set of external threads.

26. An apparatus as recited in claim 15, said threaded tubular body further comprising:
a third set of external threads.

27. An apparatus as recited in claim 26, wherein said cylindrical body and third set of external threads are tapered.

28. A drain plug apparatus for a marine vessel having a threaded tubular port, comprising:
a cylindrical body with a plurality of external threads and a tapered closed end and a flared open end;
wherein said flared open end has a central channel, a plurality of longitudinal notches and a plurality of transverse bores;
wherein said flared open end of said cylindrical body is configured to radially compress when inserted in a threaded tubular port;
wherein said external threads at a distal end of said tapered closed end of said cylindrical body are sized to be greater than or equal to the diameter of the threaded tubular port.

29. An apparatus as recited in claim 28, further comprising a handle disposed on said tapered closed end of said cylindrical body.

30. An apparatus as recited in claim 29, wherein said handle comprises a rod.

31. An apparatus as recited in claim 29, wherein said handle comprises a knurled knob.

32. An apparatus as recited in claim 29, wherein said handle comprises a polygonal shaped head.

33. An apparatus as recited in claim 29 wherein said cylindrical body further comprises means for limiting the radial compression of said flared end of said cylindrical body.

34. An apparatus as recited in claim 33 wherein said means for limiting radial compression comprises:
an annular groove on an interior surface of said flared open end of said cylindrical body; and
a resilient ring disposed within said annular groove.

* * * * *